United States Patent
Rumbak et al.

(10) Patent No.: US 12,318,993 B2
(45) Date of Patent: Jun. 3, 2025

(54) METHOD AND SYSTEM FOR REDUCING WAVINESS IN THREE-DIMENSIONAL PRINTING

(71) Applicant: Stratasys Ltd., Rehovot (IL)

(72) Inventors: Mayan Rumbak, Mazkeret Batia (IL); Omer Sinwani, Petach-Tikva (IL); Daria Fonshtein, Tel Aviv (IL); Karin Dekel, Kfar Shmuel (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/788,396

(22) PCT Filed: Dec. 23, 2020

(86) PCT No.: PCT/IL2020/051327
§ 371 (c)(1),
(2) Date: Jun. 23, 2022

(87) PCT Pub. No.: WO2021/137212
PCT Pub. Date: Jul. 8, 2021

(65) Prior Publication Data
US 2023/0029083 A1 Jan. 26, 2023

Related U.S. Application Data

(60) Provisional application No. 62/955,769, filed on Dec. 31, 2019.

(51) Int. Cl.
*B41J 2/14* (2006.01)
*B29C 64/112* (2017.01)
(Continued)

(52) U.S. Cl.
CPC .......... *B29C 64/112* (2017.08); *B29C 64/393* (2017.08); *B33Y 10/00* (2014.12);
(Continued)

(58) Field of Classification Search
None
See application file for complete search history.

(56) References Cited

U.S. PATENT DOCUMENTS 6,259,962 B1 7/2001 Gothait
6,569,373 B2 5/2003 Napadensky
(Continued)

FOREIGN PATENT DOCUMENTS

WO WO 2013/038413 3/2013
WO WO 2019/013752 1/2019
WO WO 2021/137212 7/2021

OTHER PUBLICATIONS

Communication Pursuant to Article 94(3) EPC Dated Jul. 4, 2023 From the European Patent Office Re. Application No. 20838640.9 (3 Pages).
(Continued)

*Primary Examiner* — Erica S Lin

(57) ABSTRACT

A method of printing a three-dimensional object, comprises: for each of a plurality of arrays of nozzles, activating a subset of nozzles of the array to dispense a respective building material from the subset, so as to form an interleaved scan pattern of dispensed materials. The method comprises hardening the interleaved scan pattern, and repeating the activating and the hardening to form a stack of hardened interleaved scan patterns.

19 Claims, 18 Drawing Sheets

(51) Int. Cl.
  *B29C 64/393* (2017.01)
  *B33Y 10/00* (2015.01)
  *B33Y 30/00* (2015.01)
  *B33Y 50/02* (2015.01)
  *B33Y 80/00* (2015.01)

(52) U.S. Cl.
  CPC ............... *B33Y 30/00* (2014.12); *B33Y 50/02* (2014.12); *B33Y 80/00* (2014.12); *B29K 2995/002* (2013.01); *B29K 2995/0025* (2013.01)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 8,784,723 B2 | 7/2014 | Napadensky |
| 9,031,680 B2 | 5/2015 | Napadensky |
| 2010/0121476 A1 | 5/2010 | Kritchman |
| 2013/0073068 A1* | 3/2013 | Napadensky ......... B29C 64/106 700/98 |
| 2014/0242514 A1* | 8/2014 | Inoue ................. G03G 9/08755 366/150.1 |
| 2015/0298467 A1* | 10/2015 | Cofler .................... B41J 3/4073 347/16 |

OTHER PUBLICATIONS

Office Action Dated Dec. 1, 2024 From the Israel Patent Office Re. Application No. 294362. (3 Pages).

Communication Pursuant to Article 94(3) EPC Dated Apr. 3, 2024 From the European Patent Office Re. Application No. 20838640.9 (5 Pages).

International Search Report and the Written Opinion Dated Apr. 1, 2021 From the International Searching Authority Re. Application No. PCT/IL2020/051327. (17 Pages).

* cited by examiner

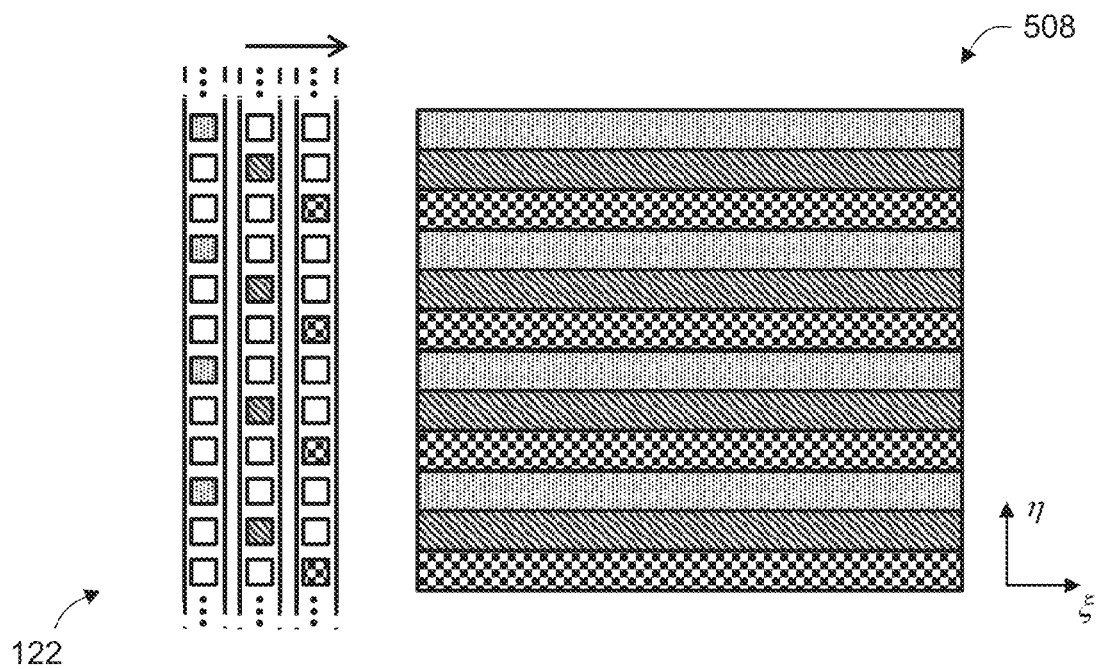
FIG. 5B
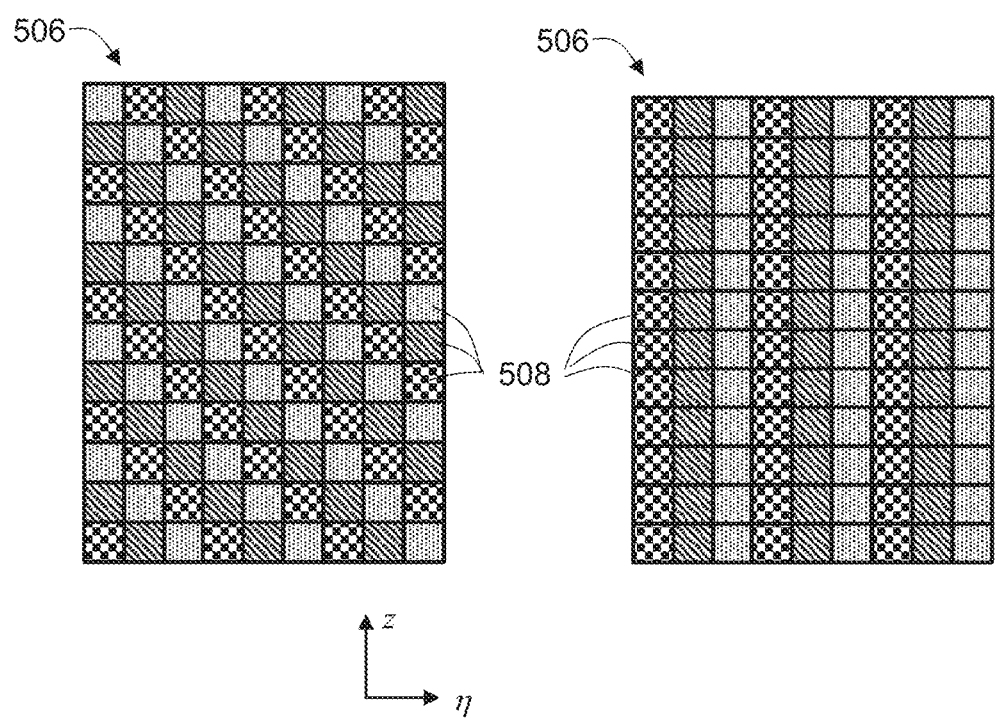
FIG. 5C
FIG. 5D y = 0.2977*x - 1.743

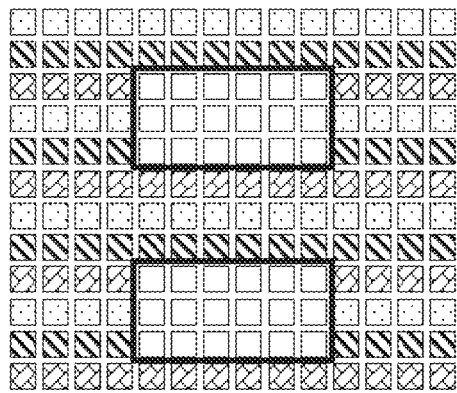
FIG. 12A
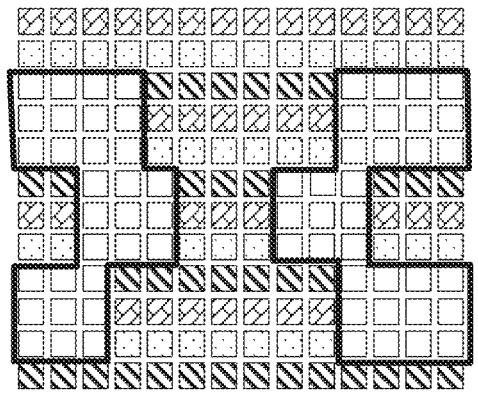
FIG. 12B
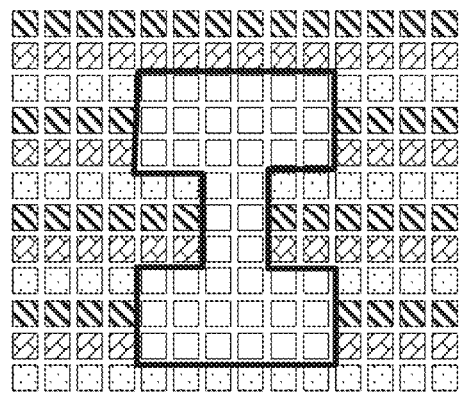
FIG. 12C
FIG. 13
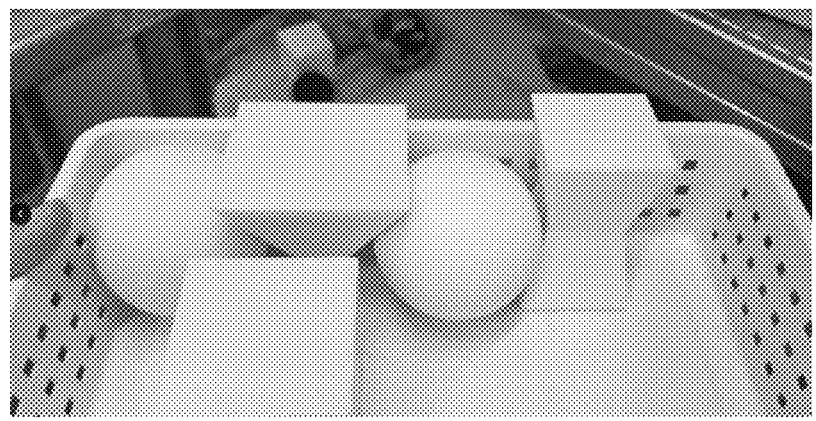

METHOD AND SYSTEM FOR REDUCING WAVINESS IN THREE-DIMENSIONAL PRINTING

RELATED APPLICATION

This application is a National Phase of PCT Patent Application No. PCT/IL2020/051327 having International filing date of Dec. 23, 2020, which claims the benefit of priority under 35 USC § 119(e) of U.S. Provisional Patent Application No. 62/955,769 filed on Dec. 31, 2019. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a method and system for reducing waviness in three-dimensional printing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 8,784,723, and 9,031,680, all of the same Assignee, the contents of which are hereby incorporated by reference.

For example, U.S. Pat. No. 8,784,723 discloses a technique for reducing the waste ratio in three-dimensional ink-jet printing, by dispensing with higher resolution at peripheral regions of the layer, and with lower resolution at interior regions of the layer by diluting the spread of material in the interior regions.

SUMMARY OF THE INVENTION

According to an aspect of some embodiments of the present invention there is provided a method of printing a three-dimensional object. The method comprises: for each of a plurality of arrays of nozzles, activating a subset of nozzles of the array to dispense a respective building material from the subset, so as to form a interleaved scan pattern of dispensed materials; hardening the interleaved scan pattern; and repeating the activating and the hardening to form a stack of hardened interleaved scan patterns.

According to some embodiments of the invention for at least one pair of adjacent scan patterns of the stack, the activating comprises, for each array, activating interleaved subsets of the array for different scan patterns of the pair.

According to some embodiments of the invention the scan pattern is composed of straight lines.

According to some embodiments of the invention the scan pattern is composed of curved lines.

According to some embodiments of the invention for at least one array, the subset comprises every nth nozzle of the array.

According to some embodiments of the invention each array receives the respective building material from a respective channel, and wherein the n is selected based on a characteristic wavelength of a standing wave generated in the channel during the dispensing.

According to some embodiments of the invention for at least one scan pattern of the stack, the hardening is executed following the dispensing without leveling the dispensed materials.

According to some embodiments of the invention at least two of the arrays dispense different building materials.

According to some embodiments of the invention the different building materials are of different colors.

According to some embodiments of the invention the stack forms an interior bulk region of the object.

According to some embodiments of the invention the method comprises dispensing one or more building materials to form an opaque region at least partially surrounding the stack.

According to some embodiments of the invention the method comprises receiving input pertaining to color texture to be visible over a surface of the object, and dispensing building materials selected in accordance with the color texture to form an outer region surrounding the opaque region.

According to some embodiments of the invention the method comprises disabling at least one nozzle of the subset so as to dilute a spread of building material at an inner portion of the stack.

According to some embodiments of the invention the disabling is executed so as to form a non-random dilution pattern of vacant locations in at least one of the interleaved scan patterns.

According to an aspect of some embodiments of the present invention there is provided a printed object, having a color texture visible over a surface thereof. The object is three-dimensional and comprises an interior bulk region, an opaque region at least partially surrounding the interior bulk region, and an outer envelope exhibiting the color texture and surrounding the opaque region, wherein the interior bulk region comprises a stack of colored interleaved scan patterns.

According to some embodiments of the invention interleaved scan patterns of at least one pair of adjacent scan patterns have different color ordering.

According to some embodiments of the invention the opaque region is white.

According to an aspect of some embodiments of the present invention there is provided an additive manufacturing printing system for printing a three-dimensional object. The system comprises: a plurality of arrays of nozzles, each configured to independently dispense a respective building material; a hardening system for hardening the building material; and a computerized controller configured for repeatedly activating a subset of nozzles of each array to dispense a respective building material from the subset, so as to form a interleaved scan pattern of dispensed materials, and for controlling the hardening system to harden each the interleaved scan pattern.

According to some embodiments of the invention computerized controller is configured for activating, for each array, interleaved subsets of the array for adjacent scan patterns.

According to some embodiments of the invention the arrays of nozzles are configured for linear scanning.

According to some embodiments of the invention the arrays of nozzles are configured for rotary scanning.

According to some embodiments of the invention for at least one array, the subset comprises every nth nozzle of the array.

According to some embodiments of the invention each array receives the respective building material from a respective channel, and wherein the n is selected based on a characteristic wavelength of a standing wave generated in the channel during the dispensing.

According to some embodiments of the invention n is at least 3.

According to some embodiments of the invention n equals 3.

According to some embodiments of the invention for at least one scan pattern of the stack, the hardening is executed following the dispensing without leveling the dispensed materials.

According to some embodiments of the invention the system is devoid of a leveling device.

According to some embodiments of the invention the stack forms an interior bulk region of the object.

According to some embodiments of the invention the computerized controller is configured for controlling the arrays to dispense one or more building materials to form an opaque region at least partially surrounding the stack.

According to some embodiments of the invention the computerized controller is configured for receiving an input pertaining to color texture to be visible over a surface of the object, and for controlling the arrays to dispense building materials selected in accordance with the input color texture to form an outer envelope surrounding the opaque region.

According to some embodiments of the invention the computerized controller is configured for disabling at least one nozzle of the subset so as to dilute a spread of building material at an inner portion of the stack.

According to some embodiments of the invention the computerized controller is configured for exiting the disabling to form a non-random dilution pattern of vacant locations in at least one of the interleaved scan patterns.

According to some embodiments of the invention the non-random dilution pattern forms at least one shape which is continuous along two orthogonal directions across the interleaved scan pattern.

According to some embodiments of the invention a collection of non-random dilution patterns across multiple interleaved scan patterns forms at least one three-dimensional shape which is continuous along three orthogonal directions within the stack.

According to some embodiments of the invention the at least one continuous three-dimensional shape comprises an hourglass shape.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-5G are schematic illustrations of a method suitable for printing a three-dimensional object according to some embodiments of the present invention;

FIGS. 12A-12C are schematic illustrations of bitmap portions of computer object data, used in experiments performed according to some embodiments of the present invention; and FIG. 13 is an image of several objects manufactured during experiments performed according to some embodiments of the present invention using a 28% dilution according to the dilution patterns shown in FIGS. 12A-C.

DESCRIPTION OF SPECIFIC EMBODIMENTS OF THE INVENTION

Figure 1A:
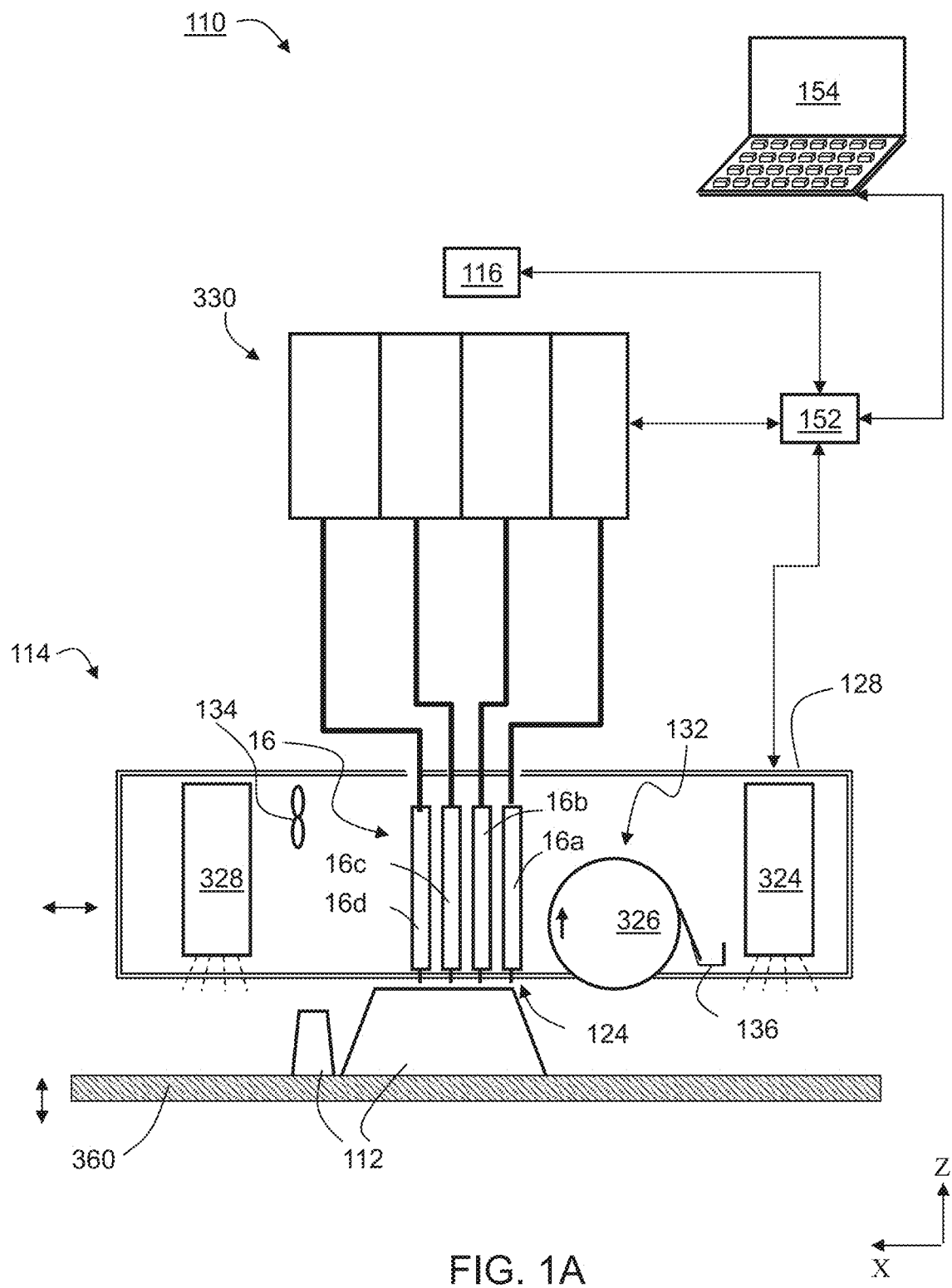
FIGS. 1A-1F are schematic illustrations of an additive manufacturing system according to some embodiments of the invention.

The present invention, in some embodiments thereof, relates to three-dimensional printing and, more particularly, but not exclusively, to a method and system for reducing waviness in three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels which are separated from each other such that there is no fluid communication therebetween, wherein each channel receives a different building material through a separate inlet and conveys it to a different array of nozzles.

In some embodiments, the printing head of the AM apparatus is a multi-channels printing head, in which case different modeling material formulations can be dispensed from two or more arrays of nozzles that are located in the same multi-channels printing head. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same multi-channels printing head. In some embodiments, an array of nozzles that dispense a modeling material formulation and an array of nozzles that dispense a support material formulation are located in separate printing heads.

Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different array of nozzles (belonging to the same or different printing heads)

of the AM apparatus. In some embodiments, two or more such arrays of nozzles that dispense different modeling materials are both located in the same printing head of the AM apparatus. In some embodiments, arrays of nozzles that dispense different modeling materials are located in separate printing heads, for example, a first array of nozzles dispensing a first modeling material is located in a first printing head, and a second array of nozzles dispensing a second modeling material is located in a second printing head.

In some embodiments, an array of nozzles that dispense a modeling material and an array of nozzles that dispense a support material are both located in the same printing head. In some embodiments, an array of nozzles that dispense a modeling material and an array of nozzles that dispense a support material are both located in separate the same printing head.

Figure 2A:
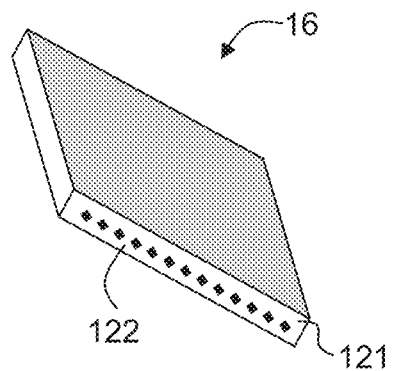
FIGS. 2A-2C are schematic illustrations of printing heads according to some embodiments of the present invention.
Figure 2B:
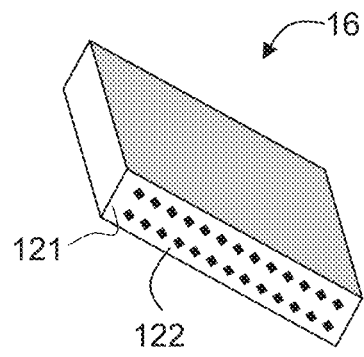
Figure 2C:
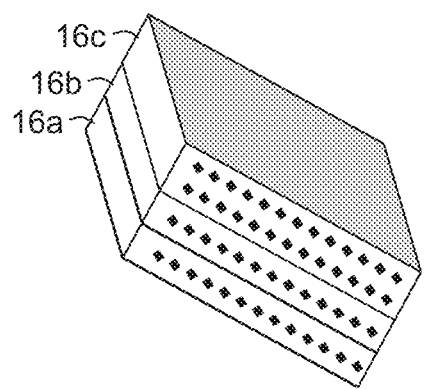

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays 122 of nozzles, typically mounted on an orifice plate 121, as illustrated in FIGS. 2A-C described below, through which a liquid building material 124 is dispensed.

Preferably, but not obligatorily, apparatus 114 is a three-dimensional printing apparatus, in which case the printing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each printing head is optionally and preferably fed via one or more building material reservoirs which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

In an embodiment of the invention, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. The ratio of modeling material dispensing arrays to support material dispensing arrays may vary. In the representative example of FIG. 1A, four printing heads 16a, 16b, 16c and 16d are illustrated.

Each of heads 16a, 16b, 16c and 16d has a nozzle array. In this Example, heads 16a and 16b can be designated for modeling material(s) and heads 16c and 16d can be designated for support material. Thus, head 16a can dispense one modeling material, head 16b can dispense another modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material, e.g. two nozzle arrays for depositing two different modeling materials or a modeling material and a support material, each via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material, the number of arrays of nozzles that dispense support material, and the number of nozzles in each respective array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout the term "about" refers to ±10%.

For example, for a=1, the overall dispensing rate of support material is generally the same as the overall dispensing rate of the modeling material when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a solidifying device 324 which can include any device configured to emit light, heat or the like that may cause the deposited material to harden. For example, solidifying device 324 can comprise one or more radiation sources, which can be, for example, an ultraviolet or visible or infrared lamp, or other sources of electromagnetic radiation, or electron beam source, depending on the modeling material being used. In some embodiments of the present invention, solidifying device 324 serves for curing or solidifying the modeling material.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the printing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the printing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
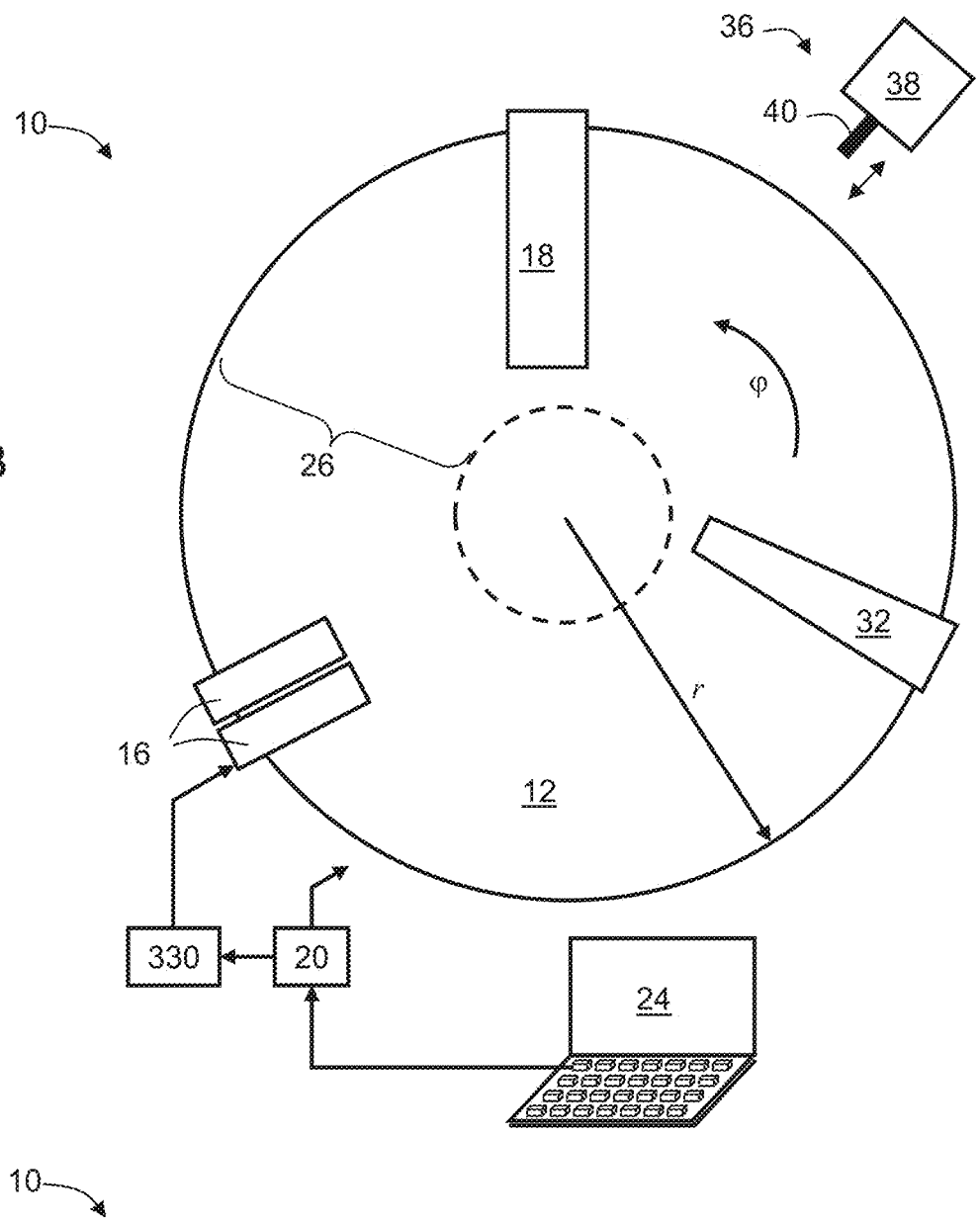
Figure 1C:
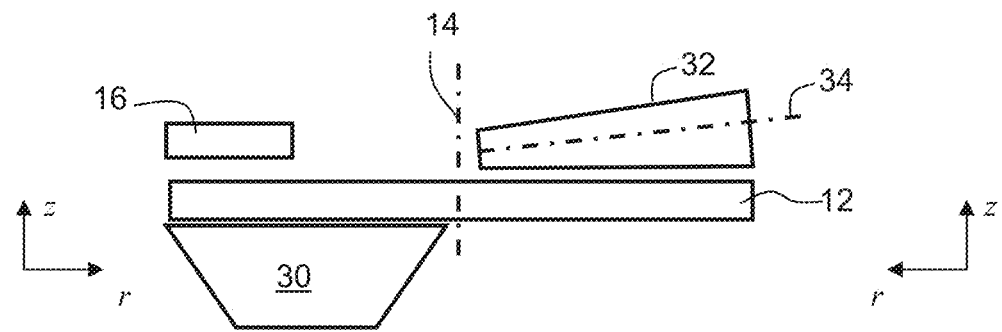
Figure 1D:
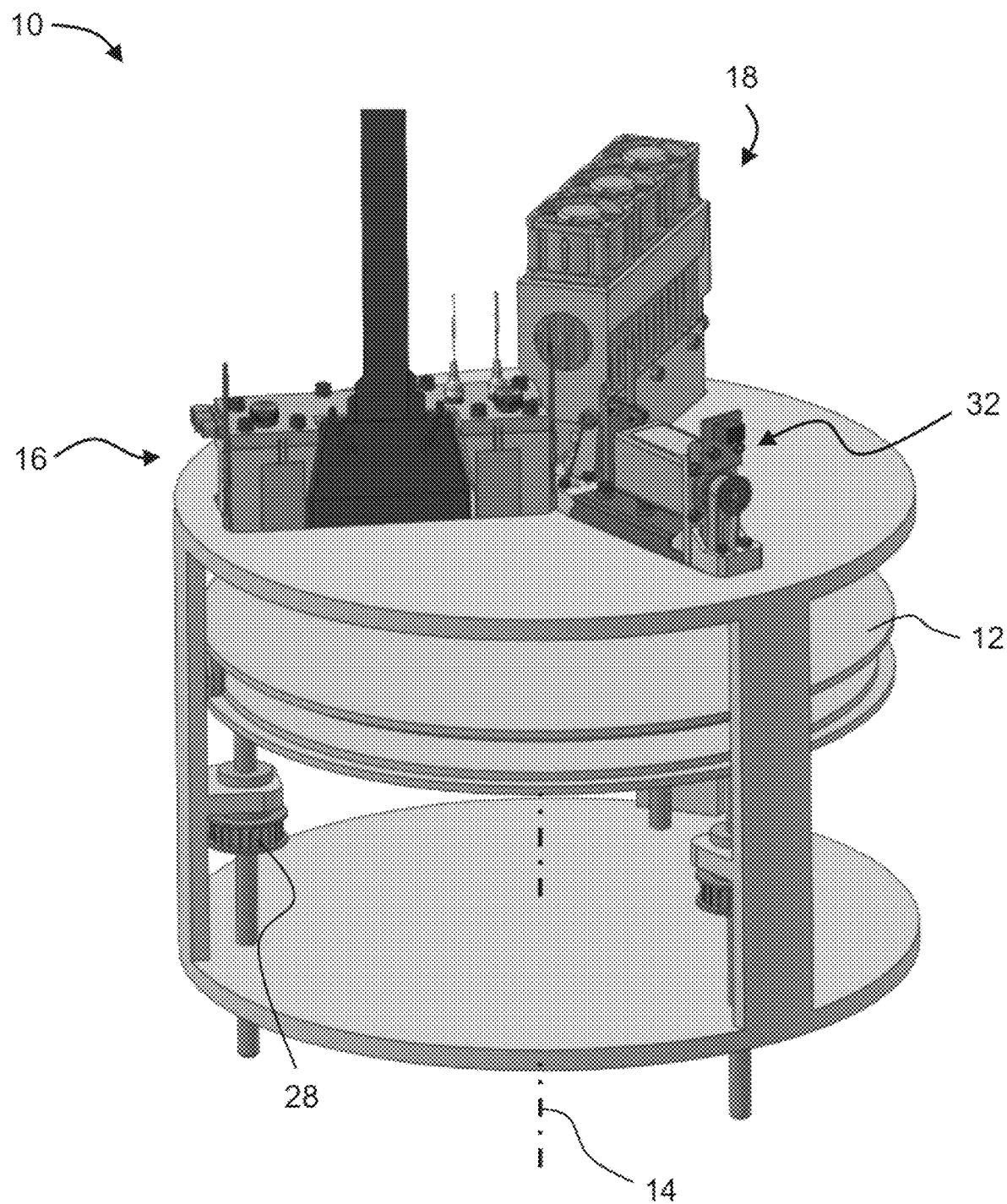

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 330, as further detailed hereinabove with respect to system 110. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material, or at least two arrays of the same head can be fed with different building materials.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
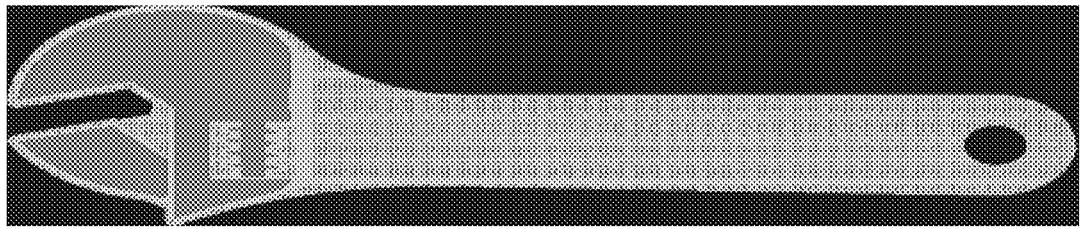
FIGS. 3A and 3B are schematic illustrations demonstrating coordinate transformations according to some embodiments of the present invention.
Figure 3B:
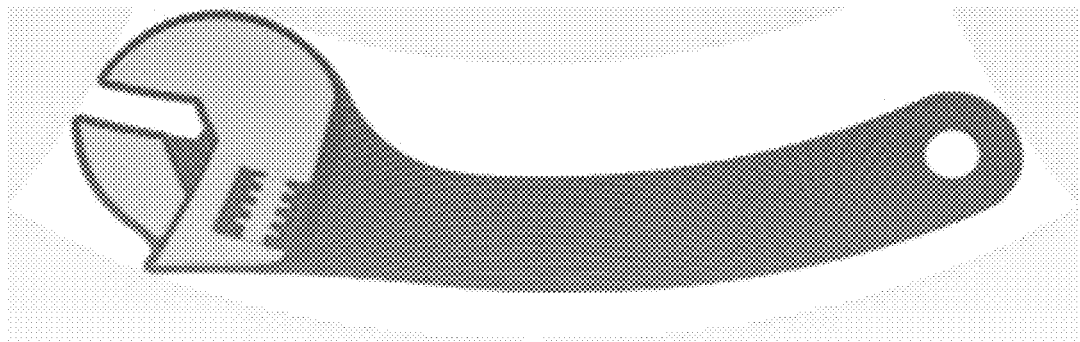

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials may be formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

As stated, AM typically includes use of one or more leveling devices (e.g., device 132 or 32), for straightening, leveling and/or establishing a thickness of the newly formed layer prior to the formation of the successive layer thereon. During the leveling operation, excess material is removed from the newly formed layer. Therefore, the leveling operation produces waste.

The waste ratio of a layer is defined as the ratio between the amount of excess material which is removed from the layer by the leveling device, and the total amount of material which is dispensed during the formation of the layer.

The Inventors of the present invention found that prior to the application of the leveling device newly dispensed layers tend to assume a wavy shape. The Inventors realized that such a wavy shape increases the waste ratio of the layer.

The Inventors of the present invention found that the waviness of the layer is the result of non-uniform droplet sizes that are dispensed from the nozzle array. While conceiving the present embodiments it was hypothesized, and while reducing the present embodiments to practice it was realized, that the non-uniform droplet sizes are due to intra-array interaction between nozzles. Without wishing to be bound to any particular theory, it is assumed that such interaction is a resonance phenomenon within the head's channel that feeds the array, which resonance phenomenon may occur during the activation of individual nozzles in the array. For example, when the nozzles are piezoelectric, mechanical piezoelectric vibration may result in buildup of a standing wave in the channel.

In a search for a solution to the problem of waviness, the Inventors conducted experiments to investigate the intra-array interaction, and found that such interaction has a characteristic span of a few nozzles. The Inventors have therefore devised a technique for reducing the waviness by temporarily disabling some of the nozzles of the array, and activating other nozzles that are sufficiently spaced apart from each other.

Figure 4:
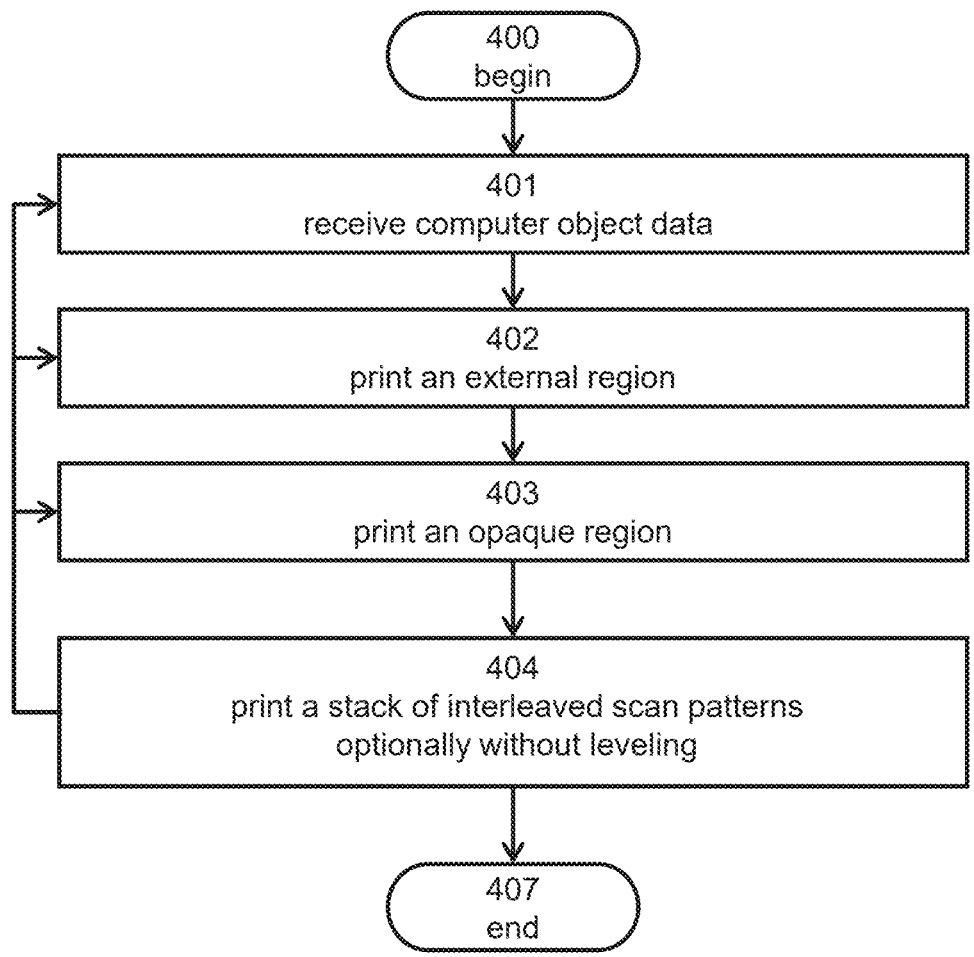
FIG. 4 is a flowchart diagram of a method suitable for printing a three-dimensional object according to some embodiments of the present invention.

FIG. 4 is a flowchart diagram and FIGS. 5A-G are schematic illustrations of a method suitable for printing a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10) operated by a controller (e.g., controller 152 or 20). The illustrations in FIGS. 5A-G are for the case in which the AM system is configured for linear scan, wherein during the relative motion between the tray and the printing head along the scanning direction the building material dispensed by a particular nozzle of array 122 forms a straight line over the tray or the previous layer. However, it is to be understood that any of the operations described below can be executed also when the AM system is configured for other relative motion paths, wherein during the relative motion between the tray and the printing head along the scanning direction the building material dispensed by a particular nozzle of array 122 forms a curved line over the tray or the previous layer. For example, any of the operations described below can be executed also when the AM system is configured for rotary scans, wherein during the relative motion between the tray and the printing head along the scanning direction the building material dispensed by a particular nozzle of array 122 forms a circular line.

As used herein "circular line" encompasses both a line that forms a full circle and a line that forms a part of a circle.

Below, and in particular in FIGS. 5A-E, generalized notations and $\xi$ and $\eta$ will be used for the scanning direction and the indexing direction, respectively. The scanning direction $\xi$ is to be understood as the direction of the relative motion between the printing heads and the tray, and the indexing direction $\eta$ is to be understood as the direction along which the array 122 is aligned, which is typically generally orthogonal to the scanning direction $\xi$ in the horizontal plane. For example, when the AM system is system 110 the scanning direction $\xi$ is to be understood as the x direction, and indexing direction $\eta$ is to be understood as the y direction, and when the AM system is system 10 the scanning direction $\xi$ is to be understood as the $\varphi$ direction, and the indexing direction $\eta$ is to be understood as the r direction.

The method begins at 400 and optionally and preferably proceeds to 401 at which at which computer object data that collectively pertains to a three-dimensional shape of the object is received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically includes a plurality of slice data each defining a layer of the object to be manufactured. The data processor can transfer the data, or a portion thereof, to the controller of the AM system. Typically, but not necessarily, the controller receives the data on a slice-by-slice basis. The data can be in any data format known in the art, including, any of the aforementioned computer object data formats.

The data received at 401 optionally and preferably also includes an input color texture, for example, in the form of an input color texture map that is defined over a plurality of pixels and describes the desired color perception of the object to be fabricated. The input color stored in each pixel of the input color texture map is optionally and preferably provided as a multibit color word having a plurality of bits (e.g., 4 bits or 8 bits or 16 bits or more) for each color component. As a representative example, the input color can comprise a multibit color word for each of the following color components: Cyan (C), Magenta (M), Yellow (Y), Black (K) and White (W). When a particular color component is described by an N-bit color word, the particular color component can have one of $2^N$ predetermined and different levels.

Figure 5A:
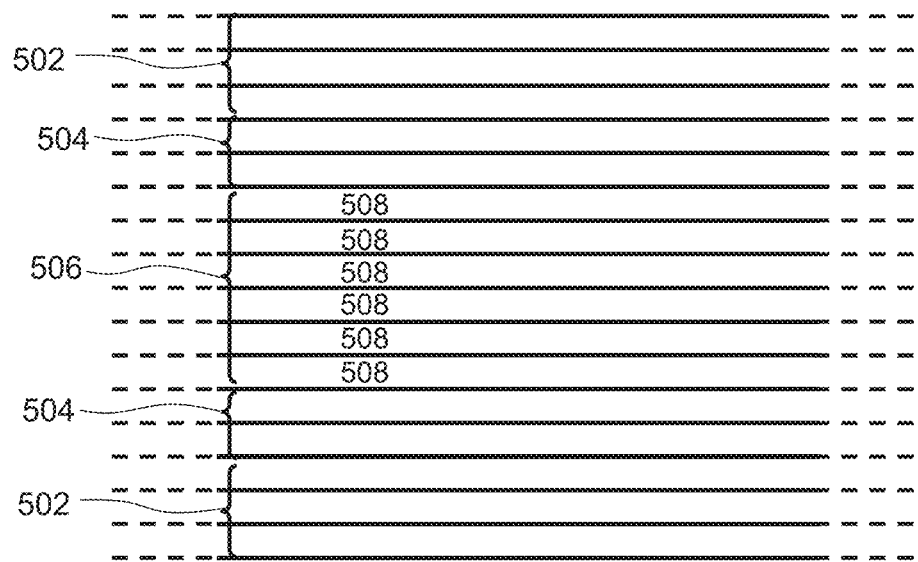
Figure 5A:
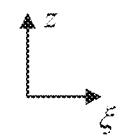

The method optionally and preferably continues to 402 at which layers of building materials are dispensed using the nozzle arrays 122 and hardened, for example, using one or more radiation sources (e.g., sources 328 or 18) as further detailed hereinabove. With reference to FIG. 5A, the dispensed and hardened layers form at least part of an external region 502 of the object. As will be described below, external region 502 can serve as a part of an outer envelope of the object to be fabricated. External region 502 is part of the final object, and is typically formed by dispensing modeling material(s) or a combination of modeling and support materials, as known in the art.

Figure 5E:
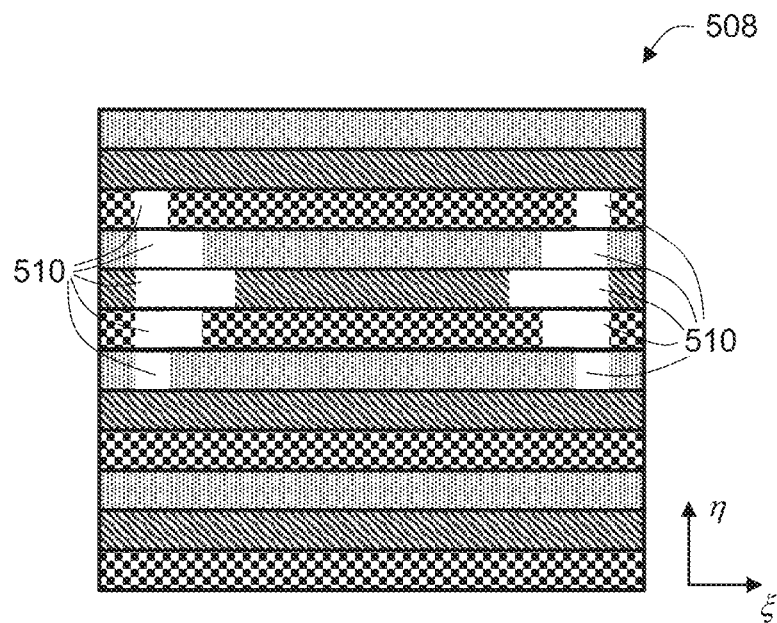
Figure 5F:
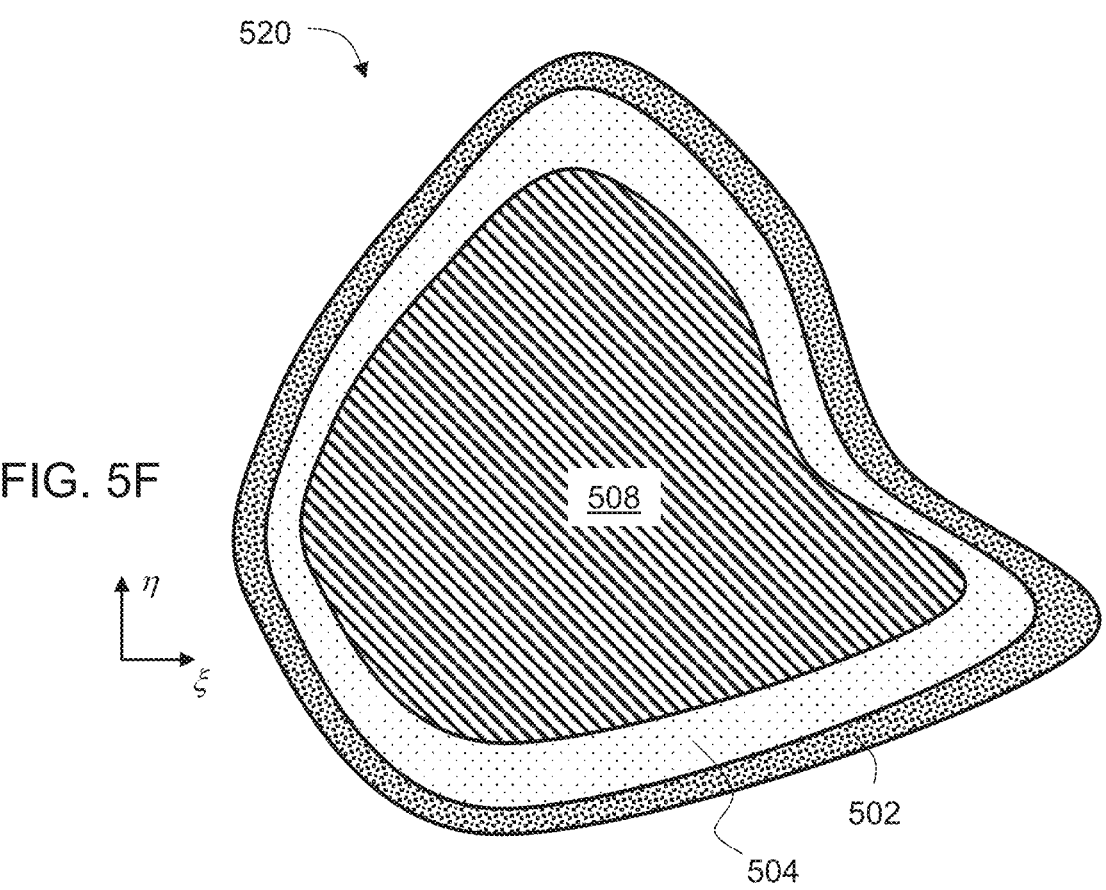
Figure 5G:
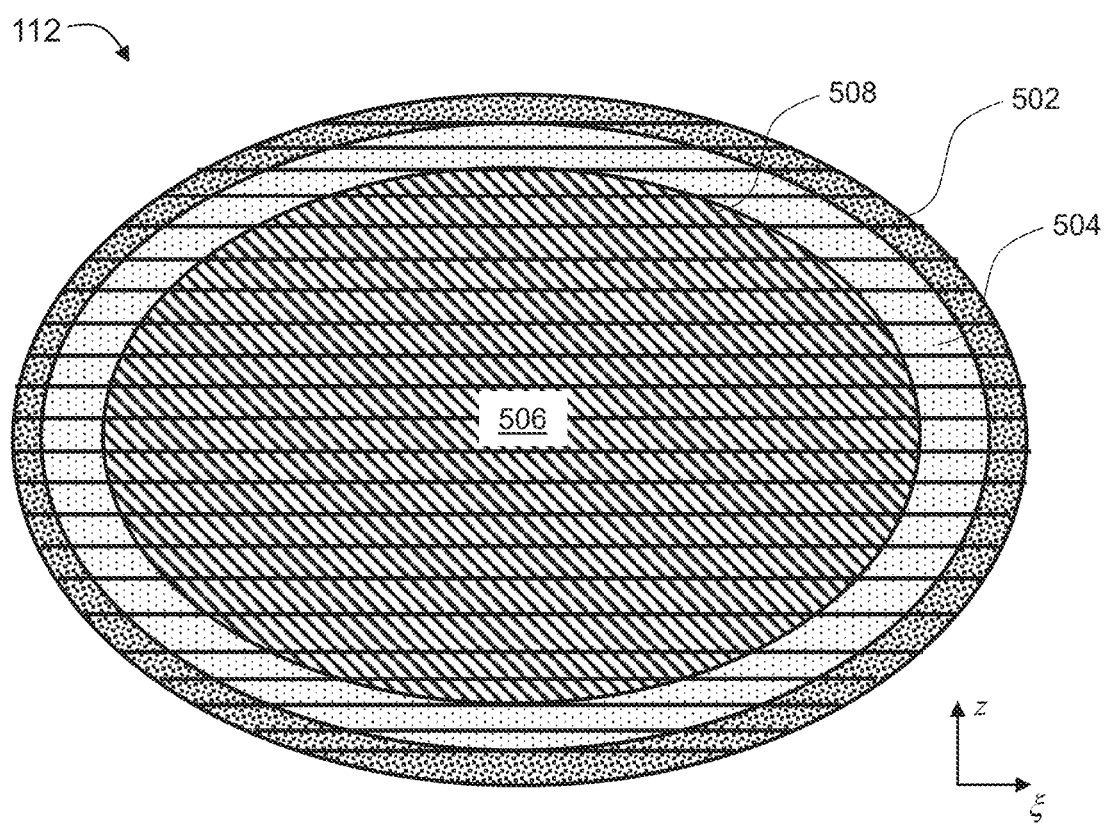

FIG. 5A illustrates a portion along the scanning direction of the fabricated object to be fabricated. Other portions will be apparent to those skilled in the art of three-dimensional printing, provided with the details described herein. For example, one or more of the operations may optionally include also dispensing and hardening building materials to form one or more support regions (not shown). The support regions are sacrificial regions that serve for supporting other parts of the final object during the printing process, and are typically formed by dispensing support materials, as known in the art. FIG. 5G is a schematic illustration of the object 112, once fabricated, and once the support structures have been removed.

The building materials that are dispensed to form external region 502 are optionally and preferably selected in accordance with a portion of the color texture map that corresponds to this region. Thus, the external region 502 exhibits a color texture that matches the respective portion of the color texture map.

The method optionally and preferably continues to 403 at which layers of building materials are dispensed and hardened to form at least part of an opaque region 504 of the object. Opaque region serves for obscuring the interior of the object, so that the observed color of the external region has the desired color texture without interference from printed patterns in the interior parts of the object. Typically, but not necessarily opaque region 504 is white, but other colors for opaque region 504 are also contemplated. For example, opaque region 504 may have a color that is complementary to the most dominant color of the external region 502.

The method optionally and preferably continues to 404 at which layers of building materials are dispensed and hardened to form at least part of a stack 506 of interleaved scan patterns 508. Each interleaved scan pattern 508 can be formed by activating, for each of two or more arrays 122, a subset of nozzles of the array to dispense a respective building material. For example, when two arrays are employed an interleaved scan pattern 508 can be formed by dispensing a first building material from a subset of nozzles of a first array of nozzles, and a second building material from a subset of nozzles of a second array of nozzles, and so on, wherein the subsets of nozzles of the arrays are selected such that they are interleaved with each other along the indexing direction η.

A representative example of this procedure is illustrated in FIG. 5B, in the ξ-η plane. Shown in FIG. 5B are portions of three arrays 122 of nozzles. In each array, a subset of nozzles designated for activation in a particular scan is shown as filled squares, and the remaining nozzles (that form a subset of nozzles designated for being disabled in the particular scan) are illustrated as open squares. The subsets of activated nozzles of any two of arrays 122 are interleaved along the indexing direction, so that no two activated nozzles are at the position along the indexing direction, and the position of each activated nozzle along the indexing direction, except the first and last in each array, is between the position along the indexing direction of two activated nozzles of other arrays.

Once the arrays 122 begin to scan by establishing relative motion between the tray and the printing heads along the scanning direction, the subsets of nozzles designated for activation are activated to dispense building materials. This forms a plurality of interleaved lines, where every two adjacent lines are dispensed from nozzles of two different arrays. While FIG. 5B illustrates the interleaved lines as straight lines, it is to be understood that when the relative motion is along a non-straight path, the interleaved lines are also non-straight (e.g., circular).

The interleaved lines are collectively referred to as scan pattern 508. Typically, different arrays 122 receive different building materials to dispense (e.g., from system 330), in which case the building materials that are dispensed from activated nozzles in different arrays are different from each other. For example, activated nozzles in different arrays can dispense modeling materials of different colors. Thus, unlike the external region 502 that is printed using building materials that are selected in accordance with the input color texture map, and unlike the opaque region 504 that is printed using building materials that are selected for opacifying said region of the printed object (e.g. white), scan pattern 508 is printed by materials selected irrespectively of the input color texture map, and that can be transparent.

The present embodiments also contemplate applications in which two or more of the arrays that dispense the scan pattern 508 receive the same building material. For example, when it is desired to print a non-colored object all arrays that form pattern 508 can dispense the same type of building material, in which case pattern 508 includes a plurality of lines that are indistinguishable from each other but are still interleaved since they have been dispensed from subsets of different arrays.

The subsets of activated and disabled nozzles in each particular array are also interleaved with each other, so that each activated nozzle, except the first and last in the array, is between two disabled nozzles. The Inventors found that interleaving of the subsets of activated and disabled nozzles of the same array reduces non-uniformity in the size of the dispensed droplets, and therefore significantly reduces the waviness of the formed layer.

The subset of activated nozzles of a particular layer is optionally and preferably selected such as to reduce, minimize, or eliminate the influence among the activated nozzles. Specifically, the distance between two adjacent nozzles in the subset of activated nozzles of an array, is selected to be larger than the characteristic interaction length of the head's channel that feeds the nozzles.

For example, the subset of activated nozzles can includes every nth nozzles of the array, where n is a positive integer larger than 1 (e.g., n=2, in which case every second nozzle is activated, or n=3, in which case every third nozzle is activated, or n=4, in which case every fourth nozzle is activated, etc.). When such mode of operation is employed for all the arrays 122 that dispense scan pattern 508, the formed pattern is periodic along the indexing direction, and the period of the pattern is n. In some embodiments of the present invention n is selected based on a characteristic wavelength of a standing wave generated in the head's channel during the dispensing.

While inactivating nozzles, the interleaving allows keeping the same printing speed, since the missing lines are compensated by activated nozzles of other array(s) during the same scan.

In some embodiments of the present invention inactivated nozzles are switched on the same array, even during the same scan, to avoid long idle time that tends to clog the nozzles.

The stack 506 is formed by successive formation of a plurality of scan patterns 508 one on top of the other, wherein each scan pattern is hardened following its dispensing and before the next pattern is dispensed on top of it. Preferably, the subsets of all arrays are activated simultaneously, thereby simultaneously forming a plurality of interleaved lines.

Since the interleaved scan patterns significantly reduce the waviness, in some embodiments of the present invention, for at least one scan pattern of the stack, the scan pattern is hardened following the dispensing with no substantial leveling or no leveling at all of the dispensed materials.

The individual scan patterns 508 in stack 506 are typically also interleaved among each other in the vertical direction z. This embodiment is illustrated in FIG. 5C showing a cross section of stack 506 the η-z plane. This embodiment is preferred from the standpoint of short idle time for the nozzles. It was found by the Inventors that reducing the idle time of a nozzle reduces the likelihood for nozzle clogging.

A structure as illustrated in FIG. 5C can be formed by alternating between the subsets of nozzles that are designated for activation for a particular array among the different scan patterns 508. For example, for one scan pattern, a first subset of nozzles designated for activation can be selected for each array, for the next scan pattern, a second subset of nozzles designated for activation can be selected for each array, and so on, wherein for each array, different subsets are designated for activation for any two adjacent scan patterns. In FIG. 5C, the interleaving along the z direction is illustrated as periodic. However, this need not necessarily be the case, since the interleaving can also be random. For example, suppose that it is desired to designate every third nozzle for activation (n=3, in the above example). This means that for a particular array, there are three possible subsets that can be defined: a first subset including nozzles indices satisfying 3k, a second including nozzles indices satisfying 3k+1, and a third subset including nozzles indices satisfying 3k+2, where k is a positive integer. A random interleaving of the scan patterns 508 along the z direction can be ensured by randomly selecting one of the first, second, and third subsets for each scan pattern 508.

The present embodiments also contemplate a configuration in which there is no interleaving along the z direction. In these embodiments, for each array, the same subset is designated for activation for each scan patterns. This embodiment is illustrated in FIG. 5D showing a cross section of stack 506 the η-z plane, where the interlacing is along the indexing direction η, but not along the vertical direction z.

In some embodiments of the present invention at least one of scan patterns 508 is dispensed in a diluted manner. In these embodiments, one or more of the nozzles in the subset of nozzles that are designated for activated is temporarily disabled so as to dilute a spread of building material in the scan pattern. A representative example of a scan pattern that is dispensed in a diluted manner is illustrated in FIG. 5E, in the ξ-η plane. During the dispensing of the interleaved lines that form scan pattern 508 several nozzles are disabled and activated repeatedly, so as to interrupt the continuity of the respective line, thus forming segmented lines, with one or more vacant locations 510 between line segments. Vacant locations 510 are preferably distributed with interleaved scan pattern 508 in a non-random manner to form a predetermined dilution pattern within scan pattern 508. The non-random dilution pattern optionally and preferably forms at least one shape which is continuous across two orthogonal directions (e.g., the scanning ξ and indexing η directions) across interleaved scan pattern 508.

Figure 6A:
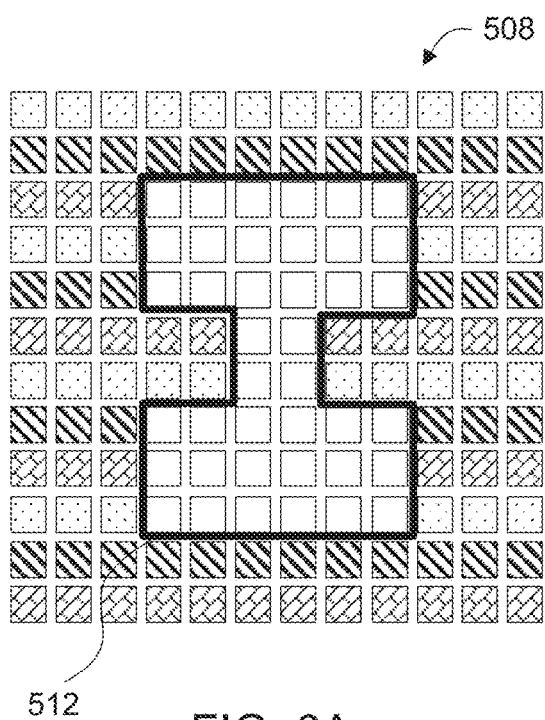
FIGS. 6A-6C are schematic illustrations of bitmap portions of computer object data, according to some embodiments of the present invention.
Figure 6B:
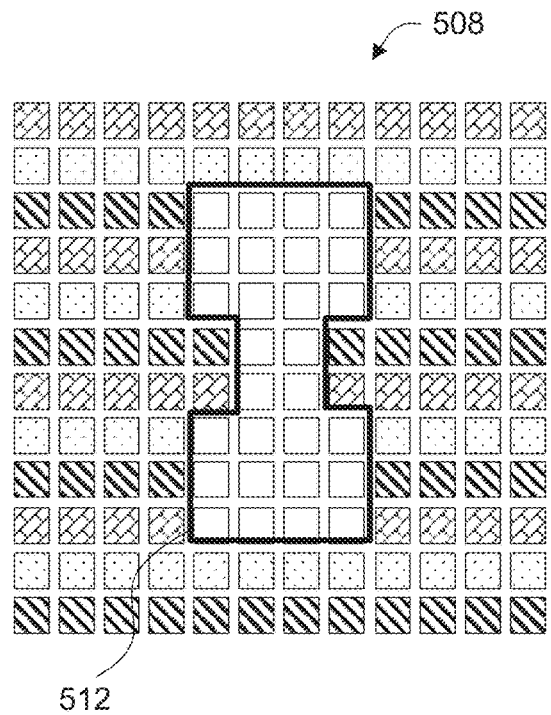
Figure 6C:
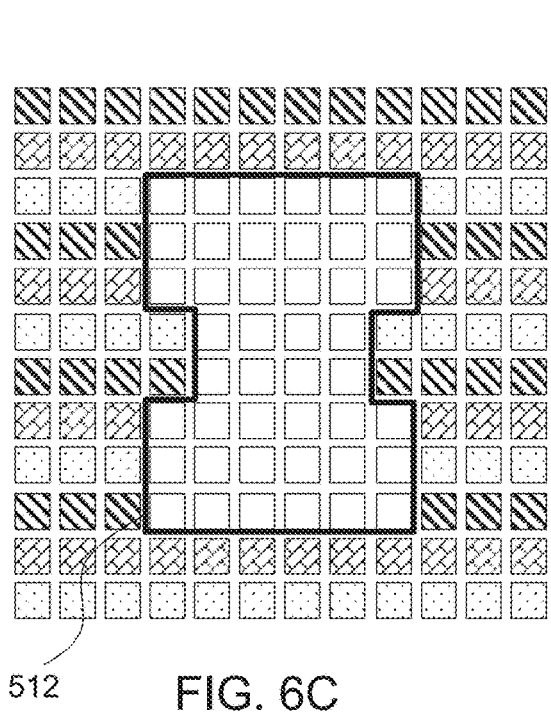

In some embodiments of the present invention a collection of non-random dilution patterns across multiple interleaved scan patterns forms one or more three-dimensional shapes which are continuous across three orthogonal directions (e.g., the scanning ξ, the indexing η, and the vertical z directions) within stack 506. A representative example of this embodiment is schematically illustrated in FIGS. 6A-C. Shown in FIGS. 6A-C are three bitmap portions of computer object data, each bitmap portion corresponding to portion of interleaved scan pattern 508 in which dilution is employed, according to some embodiments of the present invention. In FIGS. 6A-C squares with different hatchings represent code instructions to the controller of the AM system to activate respective subsets of nozzles of different arrays to dispense building materials at the respective location within the layer, to form interleaved scan pattern 508 as further detailed hereinabove. For clarity of presentation, the bitmaps in FIGS. 6A-C are designated as the scan pattern 508, even though the actual scan patterns are formed only after the bitmaps are translated by a computer to code instructions for the controller.

Empty squares in FIGS. 6A-C represent code instructions to leave the respective location vacant by temporarily disabling the respective nozzle when above the respective location over the layer. For example, when each array received modeling material of different color, the different hatchings represent different colors. Regions of the bitmap portions with empty squares form continuous two-dimensional dilution patterns designated by reference sign 512.

The bitmap portions of FIGS. 6A-C correspond to three successive layers in stack 506, exemplifying a configuration in which the individual scan patterns in the stack are interleaved among each other in the vertical direction z, in a manner similar to FIG. 5C, above. However, this need not necessarily be the case, since, for some applications, it may not be necessary for the individual scan patterns in the stack to interleave with each other, as illustrated in FIG. 5D.

Since the individual two-dimensional dilution patterns are continuous, and since FIGS. 6A-C correspond to successive layers in stack 506, the vacant locations of the dilution patterns 512 form a continuous three-dimensional shape across multiple scan patterns 508 in stack 506. The continuous three-dimensional shape can be selected in accordance with the three-dimensional shape of the object to be fabricated (for example, having generally the same three-dimensional shape except that reduced in size), or it can have a predetermined shape irrespectively of the shape of the objects. In experiments performed by the present Inventors it was found that dilution patterns that form a three-dimensional hourglass shape across multiple scan patterns in stack 506 provide adequate results (see Example 3, in the Examples section that follows).

In various exemplary embodiments of the invention, stack 506 is part of an interior bulk region of the formed object. Thus, once the stack 506 is formed additional layers are optionally and preferably dispensed on top of stack 506. The method can therefore loop back from 404 to 401 or to 402 or to 403 to dispense and harden layers of building material to form one or more additional parts of the opaque region, and the external region as further detailed hereinabove.

Some of the operations described above can be executed together with other operations. For example, portions of the opaque region 504 and of external region 502 can be formed also during the formation of stack 506, by dispensing the respective layers of building materials adjacent to stack 506 along the scanning and/or indexing direction. Specifically, during the fabrication of one or more of scan patterns 508, additional building materials can be dispensed, using different arrays of nozzles, at the same plane of the scan pattern, so as to form a layer in which the interior part of the layer includes the scan pattern 508 and the peripheral part of the layer includes the portions of the opaque region 504 and of the external region 502 that engage the same plane. A representative example of one such layer 520 is illustrated in FIG. 5F. As shown, scan pattern 508 is at the inner region of the layer, and it is surrounded, at least partially, by opaque region 504 and by external region 502, where the external region at least partially surrounds opaque region 504. A representative example of the final object 112, once fabricated, in the ξ-z plane, is illustrated in FIG. 5G, showing stack 506 as at the inner region of the object 112, surrounded, at least partially, by opaque region 504 and by external region 502, where the external region at least partially surrounds opaque region 504.

Figure 1E:
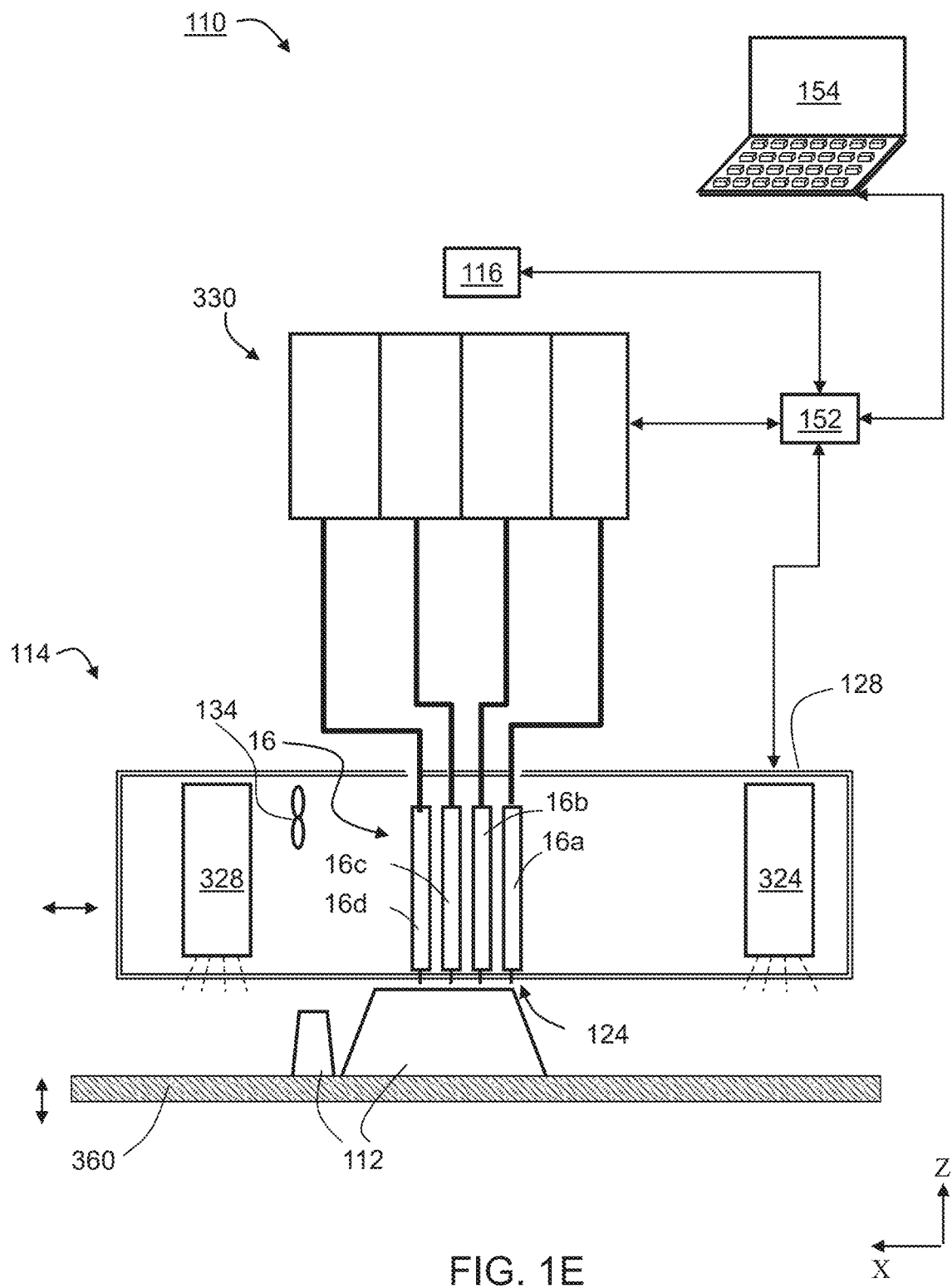
Figure 1F:
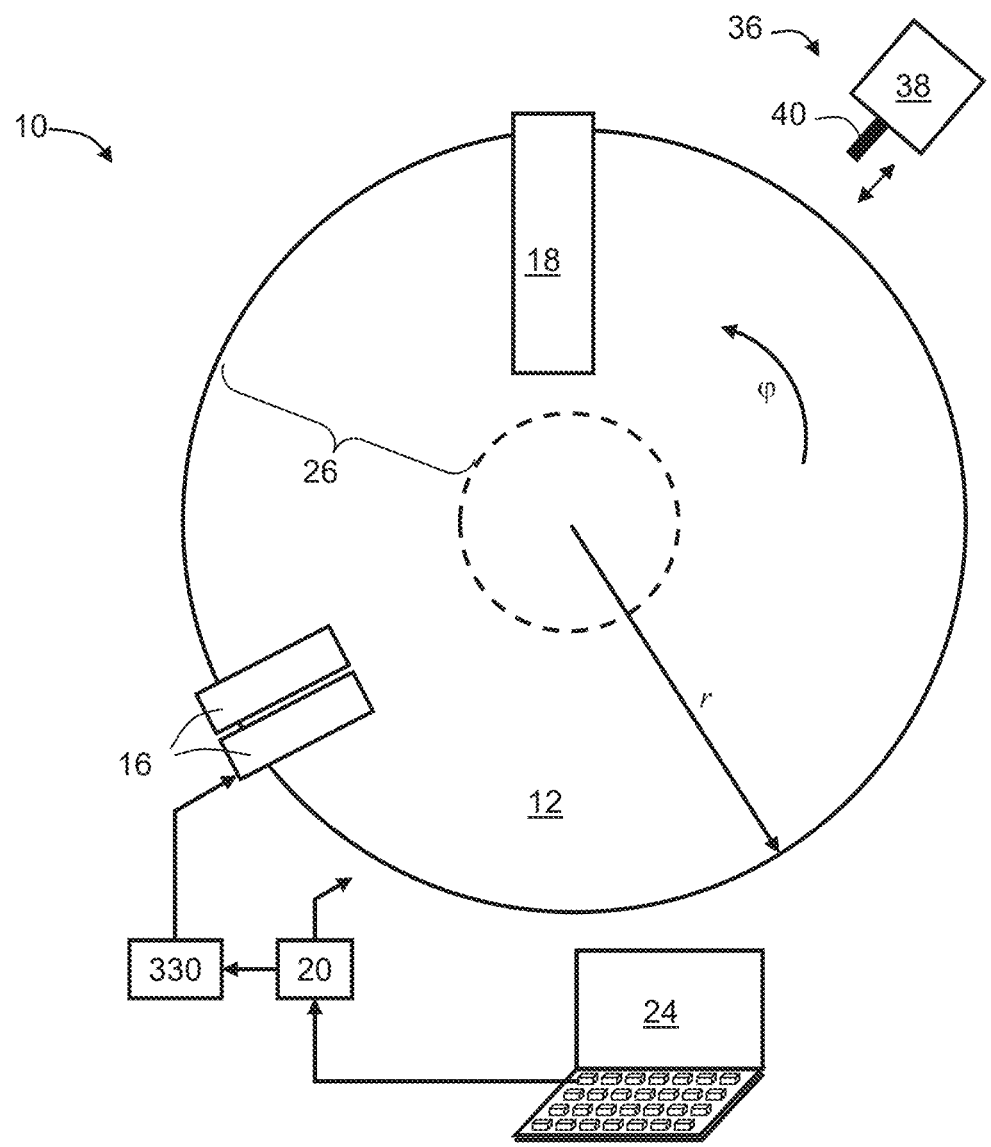

The inventors found that even though some of the layers do not include the scan pattern 508 and therefore may exhibit some variations in the sizes of the droplets, the total waviness of the formed object is substantially reduced compared to objects that do not include the scan pattern 508. The inventors found that an adequate quality can be achieved by forming the entire object, including layers that do not include an interleaved scan pattern, with no substantial leveling or no leveling of the dispensed materials. Thus, according to some embodiments of the present invention the method is executed, in its entirety without leveling the dispensed materials in any of its layers. For example, the method can be executed by an AM system that is devoid of a leveling system (e.g., system 110 without leveling system 132 as illustrated in FIG. 1E, or system 10 without leveling system 32 as illustrated in FIG. 1F).

The method ends at 407.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Printing Head Characterization

Experiments were conducted to investigate the dependence of the size and velocity of droplets dispensed from an array of nozzles of a printing head on the number of active nozzles during the dispensing. The Experiments were performed using Ricoh Gen4L print heads mounted on a custom-made jetting station in some experiments and as part of a J750™ 3D printing system (Stratasys Ltd., Israel), in other experiments.

Figure 7:
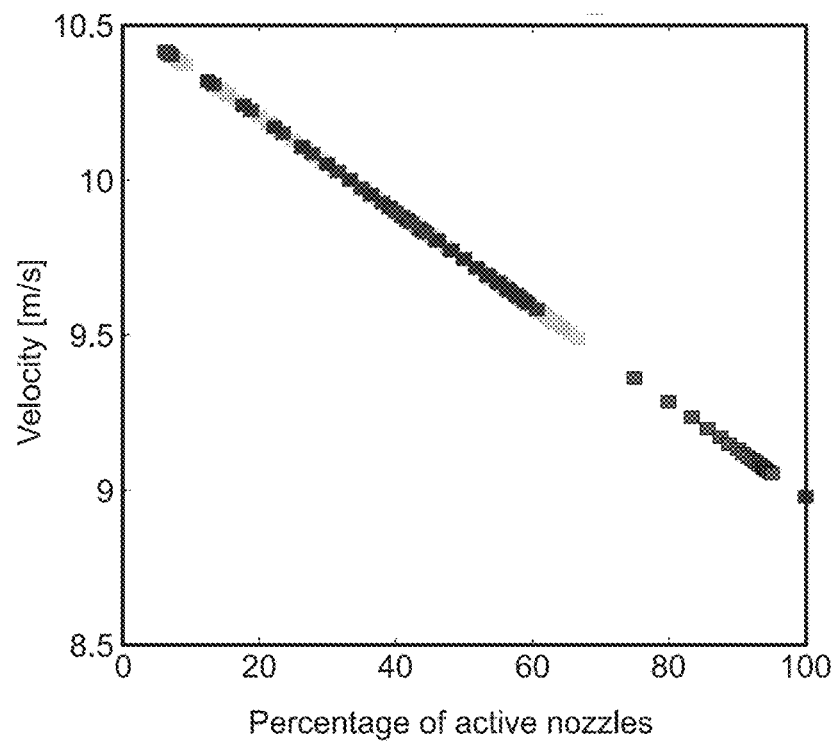
FIG. 7 is a graph showing the velocity of the droplets in m/s as a function of the percentage of the nozzles that are active during the dispensing, as obtained in experiments performed according to some embodiments of the present invention.

FIG. 7 is a graph showing the velocity of the droplets in m/s as a function of the percentage of the nozzles that are active during the dispensing.

The data presented in FIG. 7 can be described as $v=-1.53x+10.5$, where x is the (dimensionless) fraction of the nozzles that are active during the dispensing and v is the velocity in m/s.

Figure 8:
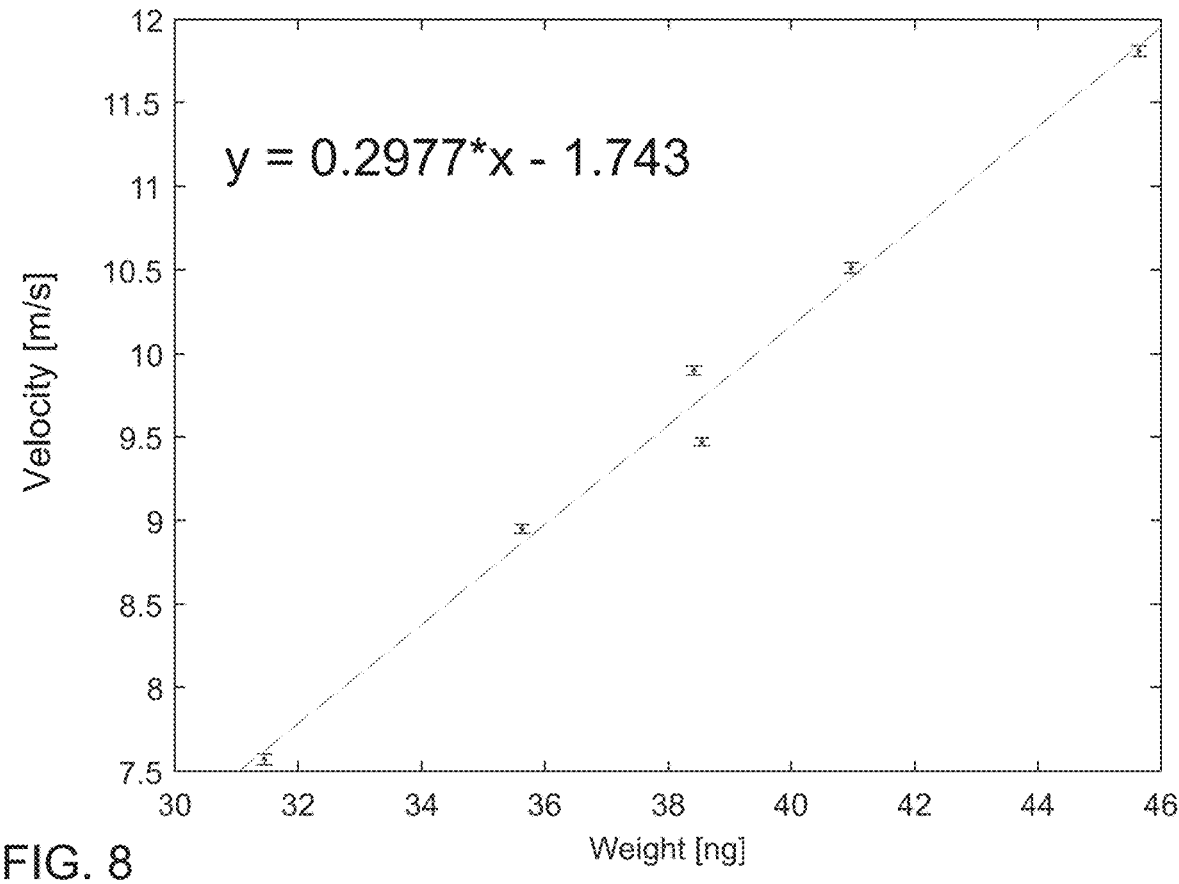
FIG. 8 is a graph showing the velocity of the droplets in m/s as a function of the mass of the droplets in ng, as obtained in experiments performed according to some embodiments of the present invention.

FIG. 8 is a graph showing the velocity of the droplets in m/s as a function of the mass of the droplets in ng. The data presented in FIG. 8 can be described as $v=2.977x-1.743$, where x is the mass of the nozzles in ng and v is the velocity in m/s.

Combining the two fits to v together, the estimated dependence of the mass of the droplet on the fraction of the active nozzles can be written as $m=41.12-5.139 N_{on}/N_{tot}$, where $N_{on}$ is the number of active nozzles in the array, and $N_{tot}$ is the total number of nozzles in the array.

Figure 9A:
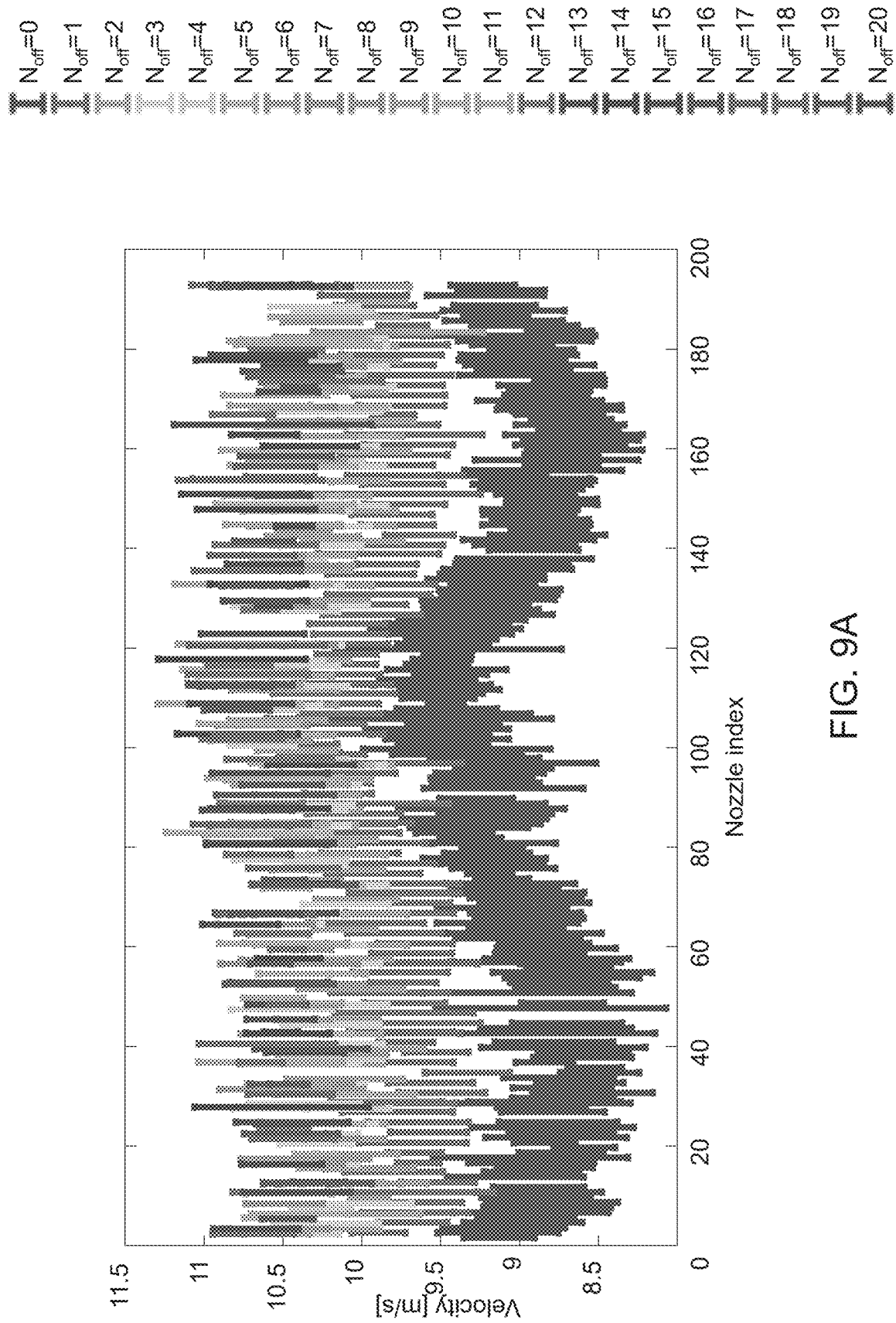
FIG. 9A is a graph showing droplet velocity in m/s, as a function of a nozzle index, for various numbers of disabled nozzles, as obtained in experiments performed according to some embodiments of the present invention.

To investigate the intra-array interaction, the following model for the velocity v of the drops was used:

$$v(Y) = \left[a\frac{Non}{Ntot} + b\right] + A\exp(-N_{off}/L)\exp(ikY + \phi)$$

where a and b are the parameters that were extracted from FIG. 7 (a=−1.53 m/s, b=10.5 m/s), $N_{off}=N_{tot}-N_{on}$, L is the characteristic interaction length of the printing head's channel, to be determined experimentally, and A, k and φ are parameters describing the standing wave that is generated during the activation of the piezoelectric nozzles. Various numbers of activated nozzles of the printing head were tested for fitting the model's parameters. FIG. 9A is a representative example of a graph obtained from such tests, for various values of $N_{off}$. As shown, the velocity varies significantly when $N_{off}=0$, and becomes more uniform as $N_{off}$ increases.

Figure 9B:
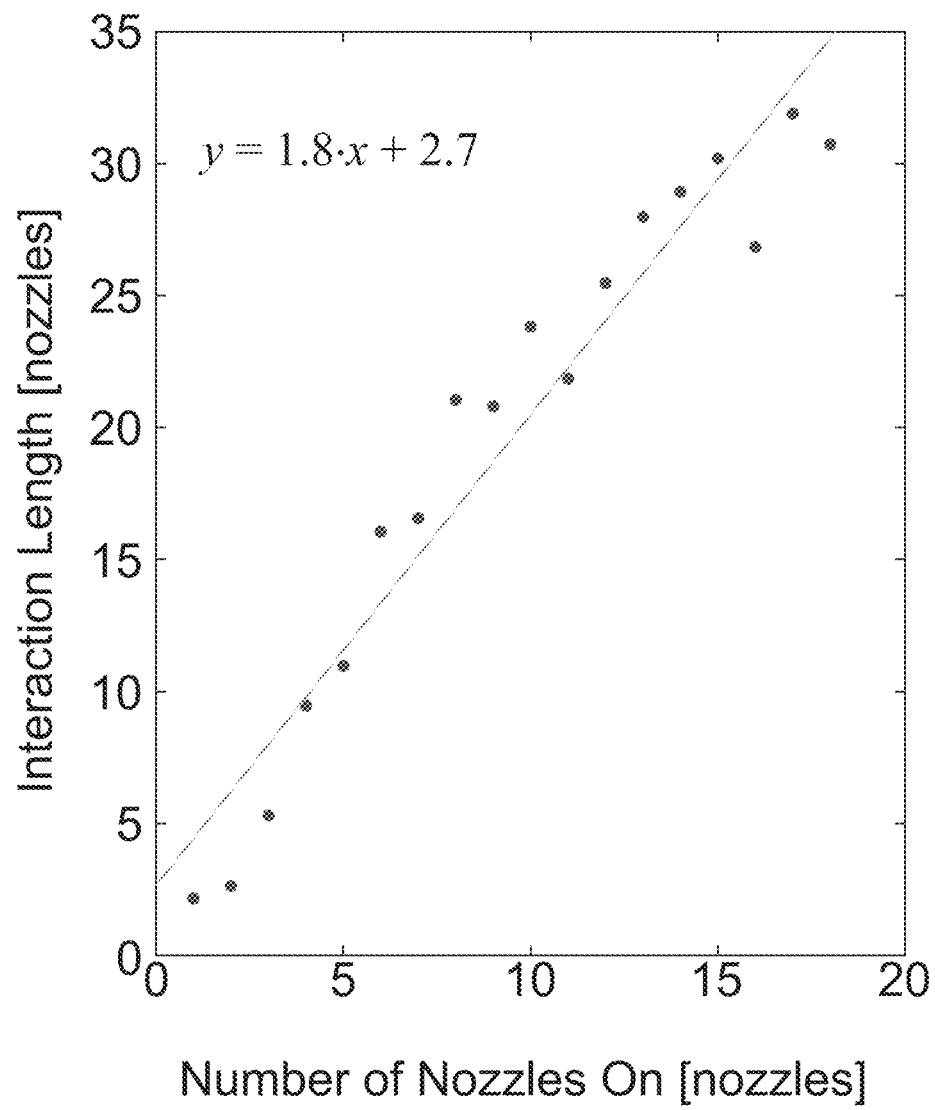
FIG. 9B is a graph of the fitted value of the characteristic interaction length in units of nozzle index as a function of the number of activated nozzles, as obtained in experiments performed according to some embodiments of the present invention.

The tests provided a list of fitted values for the characteristic interaction length L, as shown in FIG. 9B, which is a graph of the fitted value of the characteristic interaction length in units of nozzle index as a function of $N_{on}$, the number of activated nozzles. The data presented in FIG. 9B can be described as $L=1.8N_{on}+2.7$.

Additional fits were made to the wave parameters, providing the values A=0.314, k=0.05, ϕ=2.71.

In this Example, for $N_{on}=1$, the interaction length was approximately 2 (see FIG. 9B). In this case $N_{off}$ can be set to 2. This reduces the intra-array interaction by approximately 1/e, which is about one third. An even further reduction of the intra-array interaction can be achieved by selecting a subset of nozzles in which the inter-nozzle distances are more than 2 (e.g., 3 or more), for example, a subset of nozzles that includes every nth nozzle, where n>2.

Example 2

Printing of Interleaved Scan Patterns

Experiments were conducted to determine the waviness of printed three-dimensional objects with and without the inventive stack of interleaved scan pattern.

Figure 10A:
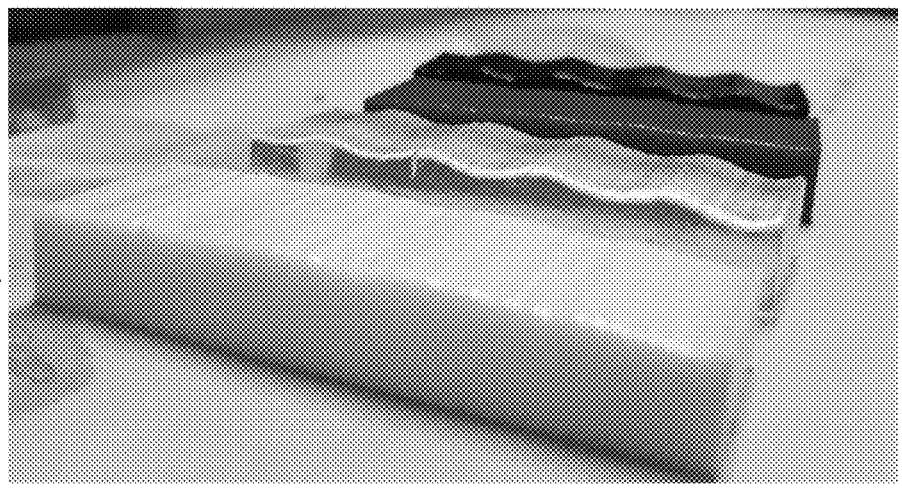
FIG. 10A is an image of four objects that were printed obtained in experiments performed according to some embodiments of the present invention using all nozzles in an array of nozzles, without forming an interleaved scan pattern.
Figure 10B:
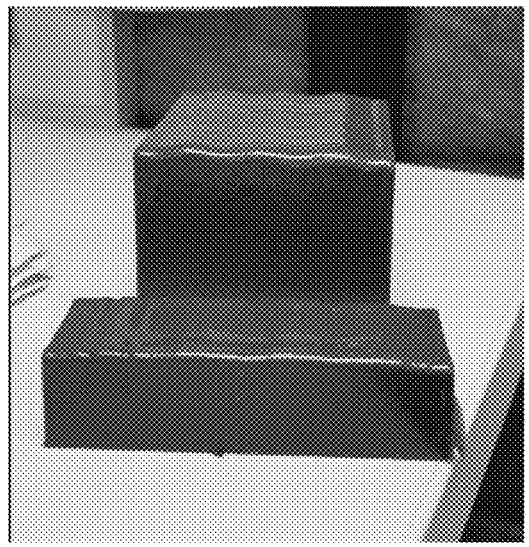
FIG. 10B is an image of two stacks of interleaved scan pattern of different heights obtained in experiments performed according to some embodiments of the present invention.

Several objects were fabricated by activating every third nozzle in the printing head's array, resulting in a stack of interleaved scan pattern. As control, several objects were fabricated using all nozzles, namely without forming an interleaved scan pattern. All arrays dispensed the same building materials, and without leveling the layer prior to the hardening. FIG. 10A is an image of four objects that were printed using all nozzles in the array, without forming the inventive interleaved scan pattern. FIG. 10B is an image of two stacks of interleaved scan pattern of different heights. As demonstrated, the use of interleaved scan pattern with n=3 substantially reduced the waviness of the fabricated object.

Example 3

Printing of Interleaved Scan Patterns with Dilution

Experiments were conducted to investigate the effect of dilution within the stack of interleaved scan pattern. Several objects were fabricated using a stack of interleaved scan pattern in the interior of the object and a white opaque region surrounding the stack. In these experiments, no color texture was printed on the external surfaces of the fabricated object. The interleaved scan patterns were printed in a diluted manner by leaving vacant locations within the interleaved scan patterns as illustrated in FIG. 5E.

Figure 11:
FIG. 11 is an image of objects fabricated during experiments performed according to some embodiments of the present invention using random distribution of the dilution, with 30% vacant locations within the stack.

FIG. 11 is an image of objects fabricated using random distribution of the dilution, with 30% vacant locations within the stack. As shown, some irregularities are formed on the external surfaces of the objects.

FIGS. 12A-C illustrate are three bitmap portions of computer object data, corresponding to three scan patterns within the stack. Squares with different hatchings represent code instructions to dispense modeling materials of different colors. In each bitmap portion, a continuous two-dimensional dilution pattern is marked by a thick line. The empty squares within the thick line represent code instructions to leave the respective location vacant. In the performed experiment, the vacant locations of the dilution patterns formed a continuous three-dimensional hourglass shape across multiple scan patterns. Thus, unlike the experiment shown in FIG. 11 in which a random dilution was employed, the dilution illustrated in FIGS. 12A-C is according to a non-random pattern, wherein the vacant locations within the layer to be fabricated form a predetermined continuous two-dimensional shape within the layer, and the collection of dilution patterns across multiple layers form a continuous three-dimensional shape.

FIG. 13 is an image of several objects manufactured using a 28% dilution according to the dilution patterns shown in FIGS. 12A-C. As demonstrated, the external surface of the object is substantially smooth.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method of printing a three-dimensional object, comprising:
for each of a plurality of arrays of nozzles controlled by a computerized controller, activating a subset of nozzles of said array to dispense a respective building material from said subset, so as to form a interleaved scan pattern of dispensed materials, wherein said interleaved scan pattern comprises a plurality of interleaved lines and wherein every two adjacent lines of said plurality of interleaved lines are dispensed from subsets of nozzles of two different arrays;
hardening said interleaved scan pattern by a hardening system controlled by said computerized controller; and
repeating said activating and said hardening to form a stack of hardened interleaved scan patterns.

2. The method according to claim 1, wherein for at least one pair of adjacent scan patterns of said stack, said activating comprises, for each array, activating interleaved subsets of said array for different scan patterns of said pair.

3. The method according to claim 1, wherein for at least one scan pattern of said stack, said hardening is executed following said dispensing without leveling said dispensed materials by a roller or by a blade.

4. The method according to claim 1, comprising dispensing one or more building materials to form an opaque region at least partially surrounding said stack.

5. The method according to claim 4, comprising receiving input pertaining to color texture to be visible over a surface of the object, and dispensing building materials selected in accordance with said color texture to form an outer region surrounding said opaque region.

6. An additive manufacturing printing system for printing a three-dimensional object, comprising:
   a plurality of arrays of nozzles, each configured to independently dispense a respective building material;
   a hardening system for hardening said building material; and
   a computerized controller configured for repeatedly activating a subset of nozzles of each array to dispense a respective building material from said subset, so as to form an interleaved scan pattern of dispensed materials, for controlling said hardening system to harden each said interleaved scan pattern, to thereby form a stack of interleaved scan patterns;
   wherein said interleaved scan pattern comprises a plurality of interleaved lines and wherein every two adjacent lines of said plurality of interleaved lines are dispensed from subset of nozzles of two different arrays.

7. The system according to claim 6, wherein said computerized controller is configured for activating, for each array, interleaved subsets of said array for scan patterns that are adjacent within said stack along a vertical direction.

8. The system according to claim 6, wherein said arrays of nozzles are configured for linear scanning.

9. The system of according to claim 6, wherein said arrays of nozzles are configured for rotary scanning.

10. The system according to claim 6, wherein for at least one array, said subset comprises every nth nozzle of said array.

11. The system according to claim 10, wherein each array receives said respective building material from a respective channel, and wherein said n is selected based on a characteristic wavelength of a standing wave generated in said channel during said dispensing.

12. The system according to claim 6, wherein for at least one scan pattern of said stack, said hardening is executed following said dispensing without leveling said dispensed materials by a roller or by a blade.

13. The system according to claim 6, being devoid of any roller or a blade serving for leveling said dispensed materials.

14. The system according to claim 6, wherein said stack forms an interior bulk region of the object.

15. The system according to claim 6, wherein said computerized controller is configured for controlling said arrays to dispense one or more building materials to form an opaque region at least partially surrounding said stack.

16. The system according to claim 6, wherein said computerized controller is configured for disabling at least one nozzle of said subset so as to dilute a spread of building material at an inner portion of said stack.

17. The system according to claim 16, wherein said computerized controller is configured for executing said disabling to form a non-random dilution pattern of vacant locations in at least one of said interleaved scan patterns.

18. The system according to claim 17, wherein said non-random dilution pattern forms at least one shape which is continuous along two orthogonal directions across said interleaved scan pattern.

19. The system according to claim 17, wherein a collection of non-random dilution patterns across multiple interleaved scan patterns forms at least one three-dimensional shape which is continuous along three orthogonal directions within said stack.

* * * * *